US012657647B2

(12) United States Patent
Sha

(10) Patent No.: US 12,657,647 B2
(45) Date of Patent: Jun. 16, 2026

(54) METHOD, APPARATUS, ELECTRONIC DEVICE AND STORAGE MEDIUM FOR GRAPHIC RENDERING

(71) Applicant: Beijing Bytedance Network Technology Co., Ltd., Beijing (CN)

(72) Inventor: Bin Sha, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 198 days.

(21) Appl. No.: 18/435,945

(22) Filed: Feb. 7, 2024

(65) Prior Publication Data

US 2024/0177262 A1 May 30, 2024

Related U.S. Application Data

(63) Continuation of application No. PCT/CN2022/107126, filed on Jul. 21, 2022.

(30) Foreign Application Priority Data

Sep. 17, 2021 (CN) .......................... 202111090626.2

(51) Int. Cl.
*G06T 1/20* (2006.01)
*G06F 9/445* (2018.01)
(52) U.S. Cl.
CPC ............ *G06T 1/20* (2013.01); *G06F 9/44521* (2013.01)
(58) Field of Classification Search
CPC ...... G06T 1/20; G06F 9/3013; G06F 9/44521
(Continued)

(56) References Cited

U.S. PATENT DOCUMENTS

2005/0140694 A1* 6/2005 Subramanian ........ G06T 17/005
345/619
2005/0174354 A1* 8/2005 Doyle ................... G06F 3/1431
345/543
(Continued)

FOREIGN PATENT DOCUMENTS

CN 108037924 A 5/2018
CN 110618876 A 12/2019
(Continued)

OTHER PUBLICATIONS

International Search Report and Written Opinion in International Appln. No. PCT/CN2022/107126, mailed on Oct. 10, 2022, 5 pages (with English translation).
(Continued)

*Primary Examiner* — Prabodh M Dharia
(74) *Attorney, Agent, or Firm* — Fish & Richardson P.C.

(57) ABSTRACT

Methods, apparatus, electronic devices, and storage media for graphic rendering are provided. In one of the methods, a first thread is created in a first namespace corresponding to a target rendering process based on a received graphic rendering task request. The target rendering process is a first operating system process. The first namespace is a namespace created in a process address space of the target rendering process and capable of running a thread of a second operating system graphic driver. In the first namespace, the second thread of a second operating system graphic driver is invoked by the first thread, to implement a graphic rendering task. In the first namespace, a first address of a first object in the first thread stored in a specified register is different from a second address of a second object in the second thread stored in the specified register.

17 Claims, 3 Drawing Sheets

CREATE THE FIRST THREAD IN A FIRST NAMESPACE CORRESPONDING TO A TARGET RENDERING PROCESS BASED ON A RECEIVED GRAPHIC RENDERING TASK REQUEST ⌐ 201

INVOKE, IN THE FIRST NAMESPACE, THE SECOND THREAD OF A SECOND OPERATING SYSTEM GRAPHIC DRIVER BY THE FIRST THREAD, TO IMPLEMENT A GRAPHIC RENDERING TASK ⌐ 202

(58) Field of Classification Search
USPC ............... 345/522, 543, 619, 564; 709/230;
706/46
See application file for complete search history.

(56) References Cited

U.S. PATENT DOCUMENTS

| | | | | | |
|---|---|---|---|---|---|
| 2006/0265508 | A1* | 11/2006 | Angel | ................. | H04L 61/2567 |
| | | | | | 709/230 |
| 2012/0086717 | A1* | 4/2012 | Liu | ....................... | G06F 3/1423 |
| | | | | | 345/564 |
| 2015/0356497 | A1* | 12/2015 | Reeder | ................. | G06Q 10/087 |
| | | | | | 705/28 |
| 2017/0358129 | A1* | 12/2017 | Chen | ................... | G06F 9/30014 |
| 2020/0290530 | A1 | 9/2020 | Im et al. | | |
| 2021/0294623 | A1* | 9/2021 | Liu | ..................... | G06F 9/45558 |
| 2022/0035519 | A1* | 2/2022 | Rathod | ................. | G06F 3/0481 |
| 2022/0276968 | A1* | 9/2022 | Zuo | .......................... | G06F 9/545 |
| 2023/0237349 | A1* | 7/2023 | Donoho | ................. | G06Q 40/02 |
| | | | | | 706/46 |

FOREIGN PATENT DOCUMENTS

| | | |
|---|---|---|
| CN | 111124664 | 5/2020 |
| CN | 111290827 | 6/2020 |
| CN | 112486620 | 3/2021 |
| CN | 112860364 A | 5/2021 |
| CN | 113110910 A | 7/2021 |
| CN | 113538207 | 10/2021 |

OTHER PUBLICATIONS

Office Action in Chinese Appln. No. 2021110906262, dated Nov. 9, 2021, 9 pages (with English translation).

* cited by examiner

CREATE THE FIRST THREAD IN A FIRST NAMESPACE CORRESPONDING TO A TARGET RENDERING PROCESS BASED ON A RECEIVED GRAPHIC RENDERING TASK REQUEST ⟋201

INVOKE, IN THE FIRST NAMESPACE, THE SECOND THREAD OF A SECOND OPERATING SYSTEM GRAPHIC DRIVER BY THE FIRST THREAD, TO IMPLEMENT A GRAPHIC RENDERING TASK ⟋202

METHOD, APPARATUS, ELECTRONIC DEVICE AND STORAGE MEDIUM FOR GRAPHIC RENDERING

CROSS-REFERENCE TO RELATED APPLICATIONS

This application is a continuation application of, and claims priority to PCT application PCT/CN2022/107126, filed on Jul. 21, 2022, which claims the benefit of Chinese Patent Application No. 202111090626.2 filed on Sep. 17, 2021, for "METHOD, APPARATUS, ELECTRONIC DEVICE AND STORAGE MEDIUM FOR CROSS-PRO-CESS INVOKED GRAPHIC RENDERING." The disclosure of the foregoing applications are incorporated here by reference

BACKGROUND

Field

The present disclosure relates to the field of computers, and in particular, to a method, an apparatus, an electronic device and a storage medium for graphic rendering.

Background

Mobile hardware platforms typically provide drivers for an Android® operating system. For example, a driver related to graphic rendering supports a graphic rendering interface EGL/GLES in the Android® operating system.

A desktop version of a Linux® operating system, such as Ubuntu, Debian, or the like, may be operated on these hardware platforms. Because hardware manufacturers usually do not provide drivers for Linux® distributions, it would be beneficial if performing a graphic rendering task on the Linux® operating system can invoke the graphic rendering interface in the Android® operating system.

SUMMARY

The present disclosure provides a method, an apparatus, an electronic device, and a storage medium for graphic rendering.

A method for graphic rendering is provided by the present disclosure. The method is applied to an electronic device, and the electronic device comprises a first operating system and a second operating system. The second operating system shares a kernel with the first operating system and is deployed in the first operating system, and the first operating system comprises a first thread, the second operating system comprises a second thread. In the method, the first thread is created in a first namespace corresponding to a target rendering process based on a received graphic rendering task request. The target rendering process is a first operating system process. The first namespace is a namespace created in a process address space of the target rendering process and capable of running a thread of a second operating system graphic driver. In the first namespace, the second thread of a second operating system graphic driver is invoked by the first thread, to implement a graphic rendering task. In the first namespace, a first address of a first object in the first thread stored in a specified register is different from a second address of a second object in the second thread stored in the specified register.

According to the method for graphic rendering provided in the present disclosure, before creating the first thread in a first namespace corresponding to a target rendering process based on a received graphic rendering task request, the method further comprises: applying for the first namespace in the process address space of the target rendering process: loading, in the first namespace, an executable and linkable format ELF file of the second operating system graphic driver: constructing, in the first namespace, a dependency list of the second operating system graphic driver based on ELF header information in the ELF file of the second operating system graphic driver, wherein the dependency list of the second operating system graphic driver describes a dynamic library list on which the second operating system graphic driver depends in the second operating system: and initializing, in the first namespace, respective dynamic libraries on which the second operating system graphic driver depends in the second operating system.

According to the method for graphic rendering provided by the present disclosure, the constructing, in the first namespace, a dependency list of the second operating system graphic driver based on ELF header information in the ELF file of the second operating system graphic driver comprises: loading a symbol table in the second operating system graphic driver into the first namespace based on the ELF header information of the second operating system graphic driver, and performing an address redirection on a symbol in the symbol table: and loading, based on the ELF header information of the second operating system graphic driver, the dynamic library list on which the second operating system graphic driver depends in the second operating system into the first namespace, to obtain the dependency list of the second operating system graphic driver.

According to the method for graphic rendering provided by the present disclosure, the first object is a tcbhead_t structure, and the second object is a thread local storage TLS array, correspondingly, initializing, in the first namespace, respective dynamic libraries on which the second operating system graphic driver depends in the second operating system comprises: intercepting, in the first namespace, a construction initialization of a system global variable associated with the second operating system graphic driver; intercepting, in the first namespace, an initialization of a resource variable associated with the thread of the second operating system graphic driver: initializing an attribute list of the second operating system graphic driver, and mapping the initialized attribute list to the first namespace: and setting, in the first namespace, the first address of the tcbhead_t structure in the first thread stored in the specified register or the second address of the TLS array in the second thread stored in the specified register, causing the first address to be different from the second address.

According to the method for graphic rendering provided by the present disclosure, setting the first address of the tcbhead_t structure in the first thread stored in the specified register or the second address of the TLS array in the second thread stored in the specified register comprises: back-shifting an address of an index corresponding to the TLS array in the second thread in the specified register, to obtain the second address.

According to the method for graphic rendering provided by the present disclosure, setting the first address of the tcbhead_t structure in the first thread stored in the specified register or the second address of the TLS array in the second thread stored in the specified register comprises: reserving an address of a portion before the tcbhead_t structure in the first thread in the specified register, to obtain the first address.

According to the method for graphic rendering provided by the present disclosure, performing an address redirection on a symbol in the symbol table comprises: for all reference symbols in the second operating system graphic driver, determining a symbol address by querying a procedure linkage table and a global offset table in the ELF file, and modifying a second operating system invocation symbol address to a first operating system invocation symbol address.

According to the method for graphic rendering provided by the present disclosure, the first operating system shares a Linux® operating system kernel Linux® Kernel with the second operating system, wherein the first thread is based on at least one C function library in libc, glibc, uclibc, klibc, eglibc, musl-libc, newlib, or dietlibc, and the second thread is based on at least one C function library in bionic, musl-libc, or libcrystax.

The present disclosure further provides an apparatus for graphic rendering, which is applied to an electronic device, and the electronic device comprises a first operating system and a second operating system. The second operating system shares a kernel with the first operating system and is deployed in the first operating system. The first operating system comprises a first thread, and the second operating system comprises a second thread. In the apparatus, a first thread creating module is configured to create the first thread in a first namespace corresponding to a target rendering process based on a received graphic rendering task request. The target rendering process is a first operating system process, and the first namespace is a namespace created in a process address space of the target rendering process and capable of running a thread of a second operating system graphic driver. A graphic rendering task implementing module is configured to invoke, in the first namespace, the second thread of a second operating system graphic driver by the first thread, to implement a graphic rendering task, wherein in the first namespace, a first address of a first object in the first thread stored in a specified register is different from a second address of a second object in the second thread stored in the specified register.

The present disclosure further provides an electronic device, and the electronic device comprises a memory, a processor, and a computer program stored on the memory and executable on the processor. The processor, when executing the program, performs operations that implement the step of any of the methods for graphic rendering mentioned above.

The present disclosure further provides a non-transitory computer-readable storage medium. The storage medium stores a computer program thereon that, when executed by a processor, implements the step of any of the method for graphic rendering mentioned above.

The present disclosure further provides a computer program product, and the computer program product comprises a computer program stored in a non-transitory computer-readable storage medium. The computer program, when executed by a processor, implements the step of any of the methods for graphic rendering mentioned above.

The present disclosure further provides a computer program, and the computer program comprises a program instruction. The program instruction, when executed by a computer, implements the step of any of the methods for graphic rendering mentioned above.

According to the method, the apparatus, the electronic device, and the storage medium for graphic rendering provided by the present disclosure, the second thread of the second operating system graphic driver is invoked by the first thread in the first namespace through creating the first thread in the first namespace corresponding to the target rendering process, to implement the graphic rendering task. According to the method for graphic rendering provided in the present disclosure, the dynamic system library in the first operating system and the graphic driver library in the second operating system may operate stably in the first namespace, thus avoiding an issue of register conflicts between the first thread and the second thread, having advantages of good real-time performance with minimal performance loss, and is suitable for use in high-frequency invocation scenarios.

BRIEF DESCRIPTION OF THE DRAWINGS

In order to more clearly illustrate the technical solutions in the present disclosure or in the Prior Art, the following will briefly introduce the drawings required for use in the description of the embodiment or Prior Art. It is obvious that the drawings described below are some embodiments of the present disclosure. For those skilled in the art, without creative effort, other drawings can be derived based on these drawings.

DETAILED DESCRIPTION

To clarify the purpose, technical solution, and advantages of the present disclosure, the technical solution in the present disclosure will be clearly and completely described in combination with the accompanying drawings. It is obvious that the described embodiments are part of the present disclosure, and not all embodiments. Based on the embodiments in the present disclosure, all other embodiments that can be obtained by those skilled in the art without creative effort fall within the scope of protection of the present disclosure.

To enable Linux® and other operating systems to invoke the graphic driver of the Android operating system during the rendering process, the dynamic system library in the Linux® operating system and the Android® graphic driver library need to be loaded simultaneously during the graphic rendering process.

Figure 1:
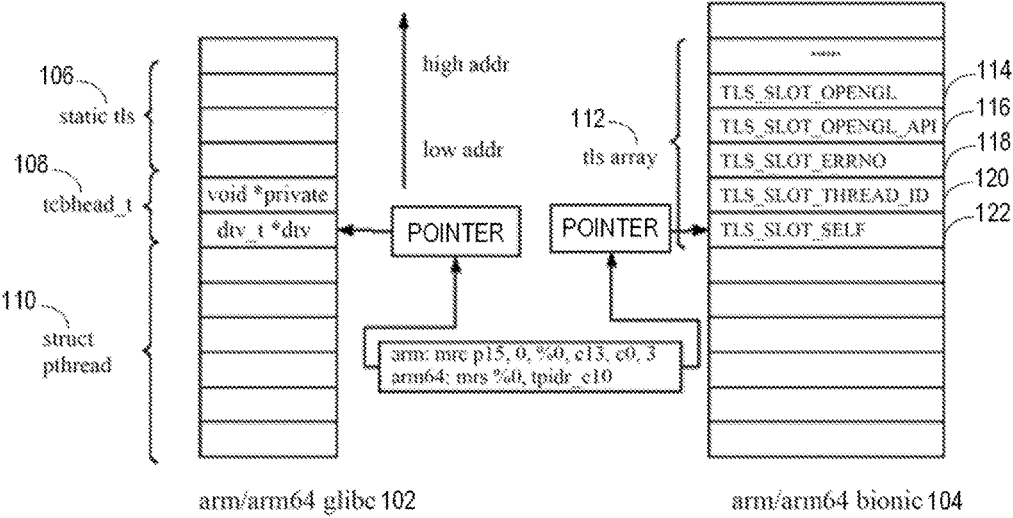
FIG. 1 is a schematic diagram illustrating a presence of a spatial conflict between threads of the dynamic system library in Linux® and Android® graphic driver threads.

When implementing the above requirements of the present disclosure, it was discovered that there are disparities in the memory layouts of the dynamic system library in the Linux® operating system and the Android® graphic driver library and it is difficult to operate stably within the same process address space. FIG. 1 is a schematic diagram of the presence of a spatial conflict between threads of the dynamic system library in Linux® and the Android® graphic driver threads. Taking FIG. 1 as an example, glibc 102 is a C language runtime library released by GNU, which is the lowest level of application programming interface (API) in the Linux® system. The glibc thread 102 is a thread in a user interface (UI) process of the Linux® system. A bionic thread 104 is an Android® graphic driver thread.

Regardless of whether it is a glibc thread 102 or a bionic thread 104, each thread has its own thread local storage (TLS), and the TLS data of the thread stores information unique to the thread, such as a variable or a name. According to relevant rules, both the glibc thread 102 and the bionic thread may save the TLS data through a gs register, where the low bit of the gs register represents a system privilege level, and the high bit represents a global descriptor table which points to a local descriptor table of glibc 102 and bionic 104.

When the dynamic system library in the Linux® operating system runs in the same process address space as the Android® graphic driver library, the glibc thread 102 uses the same gs register as the bionic thread 104, which may cause a conflict.

For example, as shown in FIG. 1, the glibc thread 102 stores information such as a static_tls structure 106, a tcbhead_t structure 108, and a struct_pthread structure 110 in the gs register. The bionic thread 104 stores a TLS array 112 in the gs register, and the TLS array 112 includes fields such as TLS_SLOT_OPENGL 114, TLS_SLOT_OPENGL_API 116, TLS_SLOT_ERRNO 118, TLS_SLOT_THREAD_ID 120, TLS_SLOT_SELF 122, and the like. During a process of thread context switching, because the involved gs registers are the same register, a conflict may occur, such as the TLS array 112 in the bionic thread 104 overwriting the tcbhead_t structure 108 in the glibc thread 102.

In order to solve the above problem, the dynamic system library of the Linux® operating system and the Android® graphic driver library are attempted to be set in different process address spaces, and then the Android® graphic driver is accessed through a manner of cross-process invocation. However, this implementation has a problem of poor real-time performance and serious performance loss and is not suitable for use in high-frequency invocation scenarios.

As described above, the Linux® operating system invoking the graphic driver of the Android® operating system is taken as an example to demonstrate the technical problem to be solved by the embodiments of the present disclosure. Those skilled in the art will appreciate that a similar application scenario, as long as its cross-system graphic driver invocation is implemented by a containerized operating system implemented by a shared operating system kernel, is applicable to the method of the embodiments of the present disclosure.

For example, the first operating system serving as a host and the second operating system deployed in the first operating system share a Linux® kernel, which is implemented through technologies such as Linux® container (LXC), containerization, or the like.

For example, the first operating system may be a variety of desktop Linux® distributions, such as Ubuntu. Debian. RedHat, or the like. It should be noted that the first operating system is not limited to running on a physical machine, but may also be hosted on other operating systems, such as a Windows® subsystem for Linux® (WSL, which is applicable to the Windows® subsystem of Linux®) in a Windows® system.

Although not explicitly described, the first operating system may further be a variety of embedded Linux® kernel-based operating systems, such as openwrt or the like.

For example, the second operating system may be an Android® operating system, which encompasses Google® published Android® operating system (OS) and Android® open source project (AOSP, an Android® open source project) and various derivative systems based on AOSP, such as MIUI. EMUI. One UI, or the like. As those skilled in the art know, there are a variety of other mobile operating systems based on the Linux® Kernel, such as Tizen®, HarmonyOS®, or the like, that are also applicable to the embodiments of the present disclosure.

Different operating systems adopt different C function libraries. The first operating system may include at least one C function library from libc, glibc, uclibc, klibc, eglibc, musl-libc, newlib, and dietlibc. The second operating system may include at least one C function library from bionic 104, musl-libc, and libcrystax. Correspondingly: the process and the thread related to graphic rendering may be implemented based on the C function library mentioned above.

For example, for common Linux® OS distributions, glibc is usually used. For common embedded Linux®, uclibc, eglibc, musl-libc, or the like is usually used. To integrate what specific type of C function library depends on the choice and requirements in the process of system development.

For example, for most Android® OS, bionic 104 is usually used. For HarmonyOS, musl-libc is usually used.

The method for graphic rendering provided by the present disclosure implements the dynamic system library of the first operating system and the graphic driver library of the second operating system running simultaneously in the same process address space. There is no conflict between the dynamic system library of the first operating system and the graphic driver library of the second operating system, thereby enabling the first operating system to achieve high-performance graphic rendering by using the graphic driver of the second operating system, which is particularly suitable for a Linux® OS using a graphic driver of an Android® OS.

The method, the apparatus, the electronic device, and the storage medium for graphic rendering of the present disclosure are described below in combination with FIG. 2 to FIG. 5.

Figure 2:
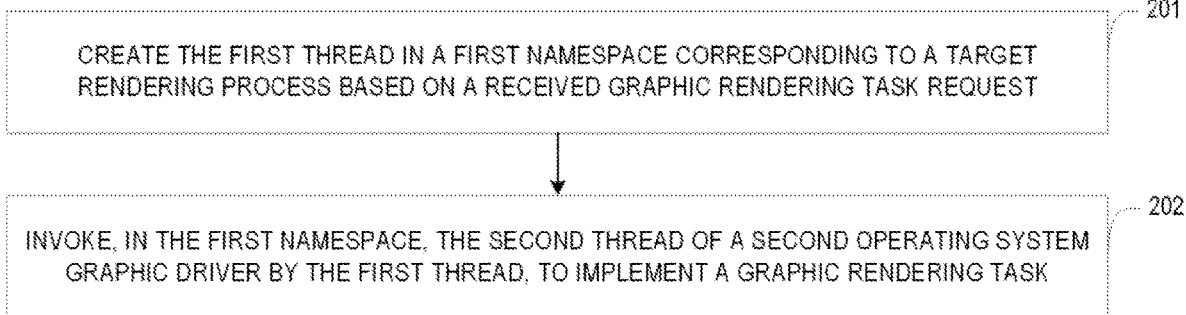
FIG. 2 is a flowchart of the method for graphic rendering provided in the present disclosure.

FIG. 2 is a flowchart of the method for graphic rendering provided in the present disclosure. As shown in FIG. 2, the method for graphic rendering provided in the present disclosure includes the following steps.

At step 201, the first thread is created in a first namespace corresponding to a target rendering process based on a received graphic rendering task request.

In the embodiments of the present disclosure, the target rendering process is a process responsible for graphic rendering in the first operating system.

According to the method of the present disclosure, the target rendering process not only assigns a corresponding process address space when the target rendering process is created, but also creates a first namespace within the process address space, where the first namespace is a namespace capable of running a thread of a second operating system graphic driver.

Taking the first operating system as the Linux® OS, the second operating system as the Android® OS as an example, according to the method of the embodiments of the present disclosure, the dynamic system library in the Linux® operating system and the Android® graphic driver library may operate stably within the same process address space (the first namespace) of the target rendering process.

In the embodiments of the present disclosure, the first namespace is already created in advance, and in other embodiments of the present disclosure, the process of creating the first namespace will be described.

In the graphic rendering process, it involves various types of graphic rendering tasks. For example, a UI Client process in the Linux® system maintains the creation and/or refresh of application windows through an EGL standard framework, applies and/or releases resources through a Gralloc driver when allocating video memory for texture information, renders a texture and/or a canvas in an image frame through a Gles standard interface. These graphic rendering tasks have characteristics of high invocation frequency and strong API/application binary interface (ABI) interface stability: Therefore, when receiving a request corresponding to a type of graphic rendering task mentioned above, the method for graphic rendering provided in the present disclosure may be used to perform the graphic rendering task.

The first thread is a thread in the target rendering process, and how to create the first thread in the first namespace corresponding to the target rendering process is common knowledge for those skilled in the art, which will not be repeated here.

At step 202, in the first namespace, the second thread of a second operating system graphic driver is invoked by the first thread, to implement a graphic rendering task.

Taking the first operating system as the Linux® OS and the second operating system as the Android OS as an example, when the dynamic system library in the Linux® operating system runs in the same process address space as the Android® graphic driver library: the glibc thread uses the same gs register as the bionic thread 104, which may cause a conflict.

In the embodiments of the present disclosure, in the first namespace, a first address of a first object (such as the tcbhead_t structure 108) in the glibc thread stored in a specified register is different from a second address of a second object (such as the TLS array 112) in the bionic thread 104 stored in the specified register. Therefore, the problem of register conflict between threads may be effectively avoided.

Specifically, to make the first address different from the second address, taking the first object as the tcbhead_t structure 108 and the second object as the TLS array 112 as an example, any of the following two implementations may be adopted.

One implementation reserves an address of a portion before the tcbhead_t structure 108 in the glibc thread in the specified register, to obtain the first address.

For example, the memory of the front location in the tcbhead_t structure 108 in the glibc thread 102 is reserved to avoid an area that conflicts with the TLS array 112 in the bionic thread 104.

Another implementation back-shifts an address of an index corresponding to the TLS array 112 in the bionic thread 104 in the specified register, to obtain the second address.

For example, index locations in the TLS array 112 in the bionic thread 104, which are prone to conflict with the tcbhead_t structure 108 in the glibc thread 102, are shifted backwards for use. The location of the specific object slot array in the first 9 bits in the bionic thread 104 is reserved. The following 130 bits universal idle array is used to store the TLS data, and the application universal TLS data and specific TLS data such as ERRNO, OPENGL_API are stored through universal setting interfaces of setspecific and getspecific.

According to the method for graphic rendering provided in the present disclosure, the second thread of the second operating system graphic driver is invoked by the first thread in the first namespace through creating the first thread in the first namespace corresponding to the target rendering process, to implement the graphic rendering task. According to the method for graphic rendering provided in the present disclosure, the dynamic system library in the first operating system and the graphic driver library in the second operating system may operate stably in the first namespace, thus avoiding an issue of register conflicts between the threads, having advantages of good real-time performance with minimal performance loss, and is suitable for use in high-frequency invocation scenarios.

Based on any of the above embodiments, in the present embodiment, before creating the first thread in a first namespace corresponding to a target rendering process based on a received graphic rendering task request, the method further comprises: applying for the first namespace in the process address space of the target rendering process: loading, in the first namespace, an executable and linkable format ELF file of the second operating system graphic driver: constructing, in the first namespace, a dependency list of the second operating system graphic driver based on ELF header information in the ELF file of the second operating system graphic driver, wherein the dependency list of the second operating system graphic driver describes a dynamic library list on which the second operating system graphic driver depends in the second operating system: and initializing, in the first namespace, respective dynamic libraries on which the second operating system graphic driver depends in the second operating system.

Figure 3:
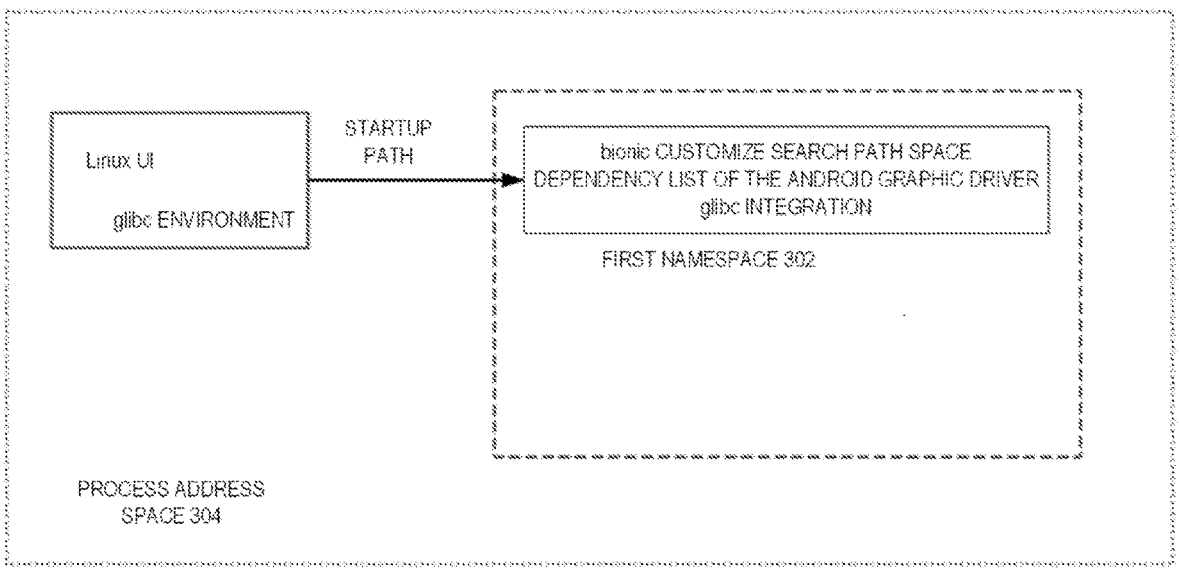
FIG. 3 is a schematic diagram of a first namespace involved in the method for graphic rendering provided in the present disclosure.

FIG. 3 is a schematic diagram of a first namespace 302. In the embodiments of the present disclosure, the creation process of the first namespace 302 will be described in combination with FIG. 3.

During the creation process of the target rendering process, a corresponding process address space 304 will be allocated for the target rendering process. Based on the allocated process address space 304, the first namespace 302 may be applied for the target rendering process. Obviously, the first namespace 302 is part of the process address space 304 of the target rendering process.

For example, the size of the process address space 304 of the target rendering process is 4G, from which a 1G process address space may be selected as the first namespace 302.

After applying for the first namespace 302, the ELF header information and the information of a specified field of the second operating system graphic driver are started loading from a specific search space in the first namespace 302. The specific search space refers to a search path where the second operating system graphic driver dynamic library and the dynamic library it depends on are located, excluding the search path of the first operating system dynamic library.

Taking the first operating system as the Linux® OS and the second operating system as the Android® OS as an example, when loading, the Executable and Linkable Format (ELF) header information of the ELF file in the Android® OS graphic driver is read firstly: then a starting address of a program header table (program_header_table) is found from the ELF header information of the graphic driver, and respective field information labeled as PT_LOAD types is started to be found and read from the starting address. The respective field information includes: virtual address information p_vaddr of respective fields, segment memory sizes p_memsz of respective fields, and segment labels p_flags of respective fields. Finally, respective parts of the ELF file of the graphic driver is sequentially mapped into the first namespace 302 through a manner of memory mapping mmap, and the address of the aforementioned program header table in the memory is recorded.

The Android® OS graphic driver described in the embodiments of the present disclosure may be a driver library such as EGL. Gles. Gralloc and the like.

After loading the ELF file of the second operating system graphic driver for the first namespace 302, a dependency list of the second operating system graphic driver is constructed in the first namespace 302, based on ELF header information in the ELF file of the second operating system graphic driver. The dependency list of the second operating system graphic driver describes a dynamic library list on which the second operating system graphic driver depends in the second operating system.

Taking the Android® as an example, because the Android® graphic driver is processed by the bionic thread 104, the dependency list is also referred to as a bionic graphic driver dependency list. In the embodiments of the present disclosure, the dependency list may also be referred to as SoInfoList.

After constructing the dependency list of the second operating system graphic driver in the first namespace 302, respective dynamic libraries on which the second operating system graphic driver depends in the second operating system may be initialized. The purpose of the initialization is to ensure that the first thread and the second thread will not conflict due to factors such as a system global variable, a resource, and a register, and to achieve simultaneous operation of the first thread and the second thread in the same process address space.

After the first namespace 302 implements multiple operations such as loading the ELF file of the second operating system graphic driver, constructing the dependency list of the second operating system graphic driver, and initializing respective dynamic libraries on which the second operating system graphic driver depends in the second operating system, the second thread of the second operating system graphic driver can be operated, and the first thread and the second thread running in the first namespace 302 simultaneously will not conflict.

According to the method for graphic rendering provided in the present disclosure, a first namespace is applied for from the process address space allocated when the target rendering process is created. Then, loading the ELF file of the second operating system graphic driver, constructing the dependency list of the second operating system graphic driver, and initializing respective dynamic libraries on which the second operating system graphic driver depends in the second operating system are implemented sequentially, the second thread that can operate the second operating system graphic driver is obtained, and the first namespace that runs the first thread and the second thread simultaneously without conflict is obtained. The present disclosure avoids the problem of conflict between the first thread and the second thread and has the advantages of good real-time performance with low performance loss, making it suitable for use in high-frequency invocation scenarios.

Based on any of the above embodiments, in the embodiments of the present disclosure, the constructing, in the first namespace, the dependency list of the second operating system graphic driver based on ELF header information in the ELF file of the second operating system graphic driver comprises: loading a symbol table in the second operating system graphic driver into the first namespace based on the ELF header information of the second operating system graphic driver, and performing an address redirection on a symbol in the symbol table: and loading, based on the ELF header information of the second operating system graphic driver, the dynamic library list on which the second operating system graphic driver depends in the second operating system into the first namespace, to obtain the dependency list of the second operating system graphic driver.

Taking the first operating system as the Linux® OS and the second operating system as the Android® OS as an example, in the process of constructing the Android® graphic driver dependency list, a DT_DYNAMIC field in the Android® graphic driver ELF header information may be firstly searched, and a first address pointing to a dynamic library array is obtained from this field. The dynamic library array contains dependency dynamic library list information, dynamic symbol table information, or the like. An array member in the dynamic library array is composed of information labeled with different types of tags, and the labeled tags are used to distinguish different types of array member information. Specifically: an array member with a type of DT_NEEDED contains dependency dynamic library list information of the Android® graphic driver, and an array member with a type of DT_SYMTAB contains dynamic symbol table information. In this step, after obtaining the first address pointing to the dynamic library array based on the DT_DYNAMIC field, respective array members in the dynamic library array may be further searched.

Next, the labeled tag in the array member information is detected, and a graphic driver library symbol table location is loaded into the first namespace based on the labeled DT_SYMTAB, and an address redirection is performed on the symbol table based on different locations of the members in the driver list, to ensure that the respective symbol table invocation addresses changes dynamically based on a location of a driver member library in the first namespace. That is, for all reference symbols in the Android graphic driver, a symbol address is determined by querying a procedure linkage table and a global offset table in the ELF file, and an Android® system invocation symbol address is modified to a Linux® invocation symbol address.

The address redirection of a symbol refers to readjusting the reference symbol in the Android® graphic driver, so that the adjusted reference symbol points to a real symbol invocation address. During the redirection, all reference symbols in the dynamic symbol table are sequentially traversed, and a real offset address location of the symbol in the Global Offset Table (GOT) through searching the corresponding location of the symbol in the Procedure Linkage Table (PLT) in the ELF. The offset address is a relative location address, and a real address of the reference symbol is finally obtained by adding the starting address mapped into the first namespace by the Android® graphic driver at the initial stage.

During the address redirection of the symbol table, a basic library symbol table in the Android® graphic driver list will be monitored, and by monitoring and replacing a bionic system invocation symbol referenced by the Android® graphic driver in the redirection stage, the Android® graphic driver is caused to enter a glibc system invocation address space when accessing a basic system invocation symbol.

Finally, based on the ELF header information of the second operating system graphic driver, the dynamic library list on which the second operating system graphic driver depends in the second operating system is loaded into the first namespace.

Taking the first operating system as the Linux® OS and the second operating system as the Android® OS as an example, the array member with a type of DT_NEEDED in the dynamic library array contains dependency dynamic library information of the Android® graphic driver. In the embodiments of the present disclosure, these array members with the field type of DT_NEEDED are referred to as driver list members.

When the dynamic library list on which the Android® graphic driver depends in the Android® environment is loaded into the first namespace, an invocation address defined in a DT_INIT_ARRAY field in the aforementioned driver list members will be sequentially searched and invoked, thereby achieving the loading of the dynamic library list.

The method for graphic rendering provided in the present disclosure realizes the construction of the dependency list of the second operating system graphic driver by loading the symbol table in the second operating system graphic driver, performing the address redirection on the symbol in the symbol table, and loading the dynamic library list on which the second operating system graphic driver depends in the second operating system. The present disclosure avoids the problem of conflict between the first thread and the second thread and has the advantages of good real-time performance with low performance loss, making it suitable for use in high-frequency invocation scenarios.

Based on any of the above embodiments, in the embodiments of the present disclosure, the first object is the tcbhead_t structure 108, and the second object is the TLS array 112.

Correspondingly, initializing, in the first namespace, respective dynamic libraries on which the second operating system graphic driver depends in the second operating system comprises: intercepting, in the first namespace, a construction initialization of a system global variable associated with the second operating system graphic driver: intercepting, in the first namespace, an initialization of a resource variable associated with the thread of the second operating system graphic driver: initializing an attribute list of the second operating system graphic driver, and mapping the initialized attribute list to the first namespace; and setting, in the first namespace, the first address of the tcbhead_t structure 108 in the first thread stored in the specified register or the second address of the TLS array 112 in the second thread stored in the specified register, causing the first address to be different from the second address.

In the embodiments of the present disclosure, the initialization process of the dynamic library will be further described.

To ensure that in the first namespace, only the systemlevel global variable created by the first thread during the construction initialization exists, and the construction initialization of the system global variable associated with the second operating system graphic driver needs to be intercepted during the initialization process of the dynamic library.

Taking the first operating system as the Linux® OS and the second operating system as the Android® OS as an example, to ensure that a thread created by the process in the Linux® operating system through the first namespace is the glibc thread in the standard Linux®, in the initialization process of the dynamic library, the initialization of the resource variable associated with the Android® graphic driver thread (the bionic thread 104) needs to be intercepted.

The second operating system graphic driver has a corresponding attribute list (for example, a bionic attribute list). During the initialization process of the dynamic library: the attribute list of the second operating system graphic driver is initialized, and the initialized attribute list is mapped to the first namespace. Specifically: socket channels may be established between namespaces of different processes, and then a data structure and key-value pair data of a corresponding attribute list (for example, a bionic attribute list) are mapped to the first namespace through the socket channel in an mmap mapping manner, so that the first namespace of different processes can share attribute list data of the second operating system graphic driver in a timely manner.

Finally, in the first namespace, the first address of the tcbhead_t structure 108 in the first thread stored in the specified register or the second address of the TLS array 112 in the second thread stored in the specified register is set, causing the first address to be different from the second address.

Taking the first operating system as the Linux® OS and the second operating system as the Android® OS as an example, as shown in FIG. 1, the glibc thread will store information such as the static_tls structure 106, the tcbhead_t structure 108, and the struct_pthread structure 110 in the gs register. The bionic thread 104 will store the TLS array 112 in the gs register. The TLS array 112 includes fields such as TLS_SLOT_OPENGL 114. TLS_SLOT_OPENGL_API 116, TLS_SLOT_ERRNO 118, TLS_SLOT_THREAD_ID 120 and TLS_SLOT_SELF 122. During the process of thread context switching, because the involved gs registers are the same register, in Prior Art, the glibc thread and the bionic thread 104 may conflict, such as the TLS array 112 in the bionic thread 104 overwriting the tcbhead_t structure 108 in the glibc thread 102.

In the embodiments of the present disclosure, avoidance of a register conflict that easily occurs during the thread context switching between the first thread and the second thread can be achieved by setting the first address or setting the second address.

When setting the first address, an address of a portion before the tcbhead_t structure 108 in the first thread in the specified register is reserved, to obtain the first address.

For example, the memory of the front location in the tcbhead_t structure 108 under the glibc thread 102 is reserved to avoid an area that conflicts with the TLS array 112 in the bionic thread 104.

When setting the second address, an address of an index corresponding to the TLS array 112 in the second thread in the specified register is shifted backwards, to obtain the second address.

For example, index locations in the TLS array 112 in the bionic thread 104, which are prone to conflict with the tcbhead_t structure 108 in the glibc thread 102, are shifted backwards for use. The location of the specific object slot array in the first 9 bits in the bionic thread 104 is reserved. The following 130 bits universal idle array is used to store the TLS data, and the application universal TLS data and specific TLS data such as ERRNO, OPENGL_API are stored through universal setting interfaces of setspecific and getspecific.

Different dynamic libraries have different initialization work when loaded into the process address space. The method of the present disclosure does not initialize the basic environment such as the bionic thread 104 in the bionic basic system library during the initialization stage to avoid a conflict with the glibc thread, after loading the bionic graphic driver into the process address space corresponding to the first namespace. Instead, feature integration of glibc and bionic is realized by constructing an attribute list initialization mechanism of bionic.

Taking the first operating system as the Linux® OS and the second operating system as the Android® OS as an example, during the initialization of the dynamic library: the first namespace will still monitor the basic library in the driver list members. On the basis of the prioritized completion of a glibc initialization action in the Linux® system, an attribute system of the bionic is initialized. In other words, an attribute list mechanism required for the bionic graphic driver is constructed in the process address space corresponding to the first namespace, to realize the integration of the bionic thread 104 and the glibc thread 102 in the memory space.

The method for graphic rendering provided in the present disclosure ensures that the first thread and the second thread do not conflict due to the system-level global variable, the resource, and the register by initializing respective dynamic libraries on which the second operating system graphic driver depends in the second operating system.

An apparatus for graphic rendering provided in the present disclosure will be described below, and the apparatus for graphic rendering described below and the method for graphic rendering described above can correspond to each other.

Figure 4:
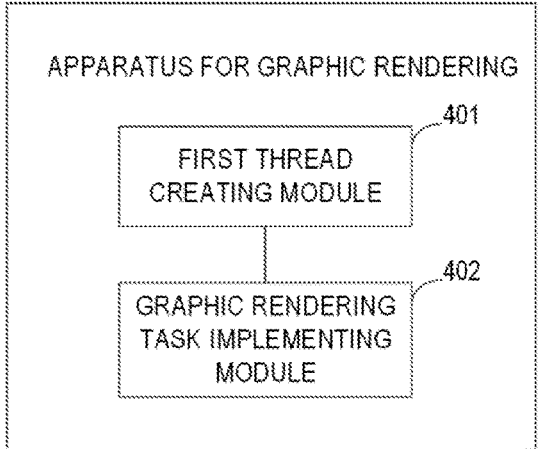
FIG. 4 is a schematic diagram of a structure of an apparatus for graphic rendering provided in the present disclosure.

FIG. 4 is a schematic diagram of the apparatus for graphic rendering provided in the present disclosure. As shown in FIG. 4, the apparatus for graphic rendering provided by the present disclosure is applied to an electronic device. The electronic device comprises a first operating system and a second operating system. The second operating system shares a kernel with the first operating system and is deployed in the first operating system. The first operating system comprises a first thread, and the second operating system comprises a second thread. In the apparatus, a first thread creating module 401 is configured to create the first thread in a first namespace corresponding to a target rendering process based on a received graphic rendering task request. The target rendering process is a first operating system process. The first namespace is a namespace created in a process address space of the target rendering process and capable of running a thread of a second operating system graphic driver. A graphic rendering task implementing module 402 is configured to invoke, in the first namespace, the second thread of a second operating system graphic driver by the first thread, to implement a graphic rendering task. In the first namespace, a first address of a first object in the first thread stored in a specified register is different from a second address of a second object in the second thread stored in the specified register.

According to the apparatus for graphic rendering provided by the present disclosure, the second thread of the second operating system graphic driver is invoked by the first thread in the first namespace through creating the first thread in the first namespace corresponding to the target rendering process, to implement the graphic rendering task. According to the method for graphic rendering provided in the present disclosure, the dynamic system library in the first operating system and the graphic driver library in the second operating system may operate stably in the first namespace, thus avoiding an issue of register conflicts between the first thread and the second thread, having advantages of good real-time performance with minimal performance loss, and is suitable for use in high-frequency invocation scenarios.

Based on any of the above embodiments, in the embodiments of the present disclosure, in the apparatus, a space application module is configured to apply for the first namespace in the process address space of the target rendering process. A graphic driver information loading module is configured to load, in the first namespace, an executable and linkable format ELF file of the second operating system graphic driver. A dependency list constructing module is configured to construct, in the first namespace, a dependency list of the second operating system graphic driver based on ELF header information in the ELF file of the second operating system graphic driver, wherein the dependency list of the second operating system graphic driver describes a dynamic library list on which the second operating system graphic driver depends in the second operating system. An initializing module is configured to initialize, in the first namespace, respective dynamic libraries on which the second operating system graphic driver depends in the second operating system.

According to the apparatus for graphic rendering provided in the present disclosure, a first namespace is applied for from the process address space allocated when the target rendering process is created. Then, loading the ELF file of the second operating system graphic driver, constructing the dependency list of the second operating system graphic driver, and initializing respective dynamic libraries on which the second operating system graphic driver depends in the second operating system are implemented sequentially: the second thread that can operate the second operating system graphic driver is obtained, and the first namespace that runs the first thread and the second thread simultaneously without conflict is obtained. The present disclosure avoids the problem of conflict between the first thread and the second thread and has the advantages of good real-time performance with low performance loss, making it suitable for use in high-frequency invocation scenarios.

Based on any of the above embodiments, in the embodiments of the present disclosure, in the dependency list constructing module, an address redirection unit is configured to load a symbol table in the second operating system graphic driver into the first namespace based on the ELF header information of the second operating system graphic driver, and perform an address redirection on a symbol in the symbol table. A dynamic library list loading unit is configured to load, based on the ELF header information of the second operating system graphic driver, the dynamic library list on which the second operating system graphic driver depends in the second operating system into the first namespace, to obtain the dependency list of the second operating system graphic driver.

The apparatus for graphic rendering provided in the present disclosure realizes the construction of the dependency list of the second operating system graphic driver by loading the symbol table in the second operating system graphic driver, performing the address redirection on the symbol in the symbol table, and loading the dynamic library list on which the second operating system graphic driver depends in the second operating system. The present disclosure avoids the problem of conflict between the first thread and the second thread and has the advantages of good real-time performance with low performance loss, making it suitable for use in high-frequency invocation scenarios.

Based on any of the above embodiments, in the embodiments of the present disclosure, the first object is a tcbhead_t structure 108, and the second object is a TLS array 112, correspondingly: in the initializing module, a global variable construction initialization intercepting unit is configured to intercept, in the first namespace, a construction initialization of a system global variable associated with the second operating system graphic driver. A resource variable initialization intercepting unit is configured to intercept, in the first namespace, an initialization of a resource variable associated with the thread of the second operating system graphic driver. An attribute list mapping unit is configured to initialize an attribute list of the second operating system graphic driver, and mapping the initialized attribute list to the first namespace. An address setting unit is configured to set, in the first namespace, the first address of the tcbhead_t structure 108 in the first thread stored in the specified register or the second address of the TLS array 112 in the second thread stored in the specified register, causing the first address to be different from the second address.

The apparatus for graphic rendering provided in the present disclosure ensures that the first thread and the second thread do not conflict due to the system-level global variable, the resource, and the register by initializing respective dynamic libraries on which the second operating system graphic driver depends in the second operating system.

Figure 5:
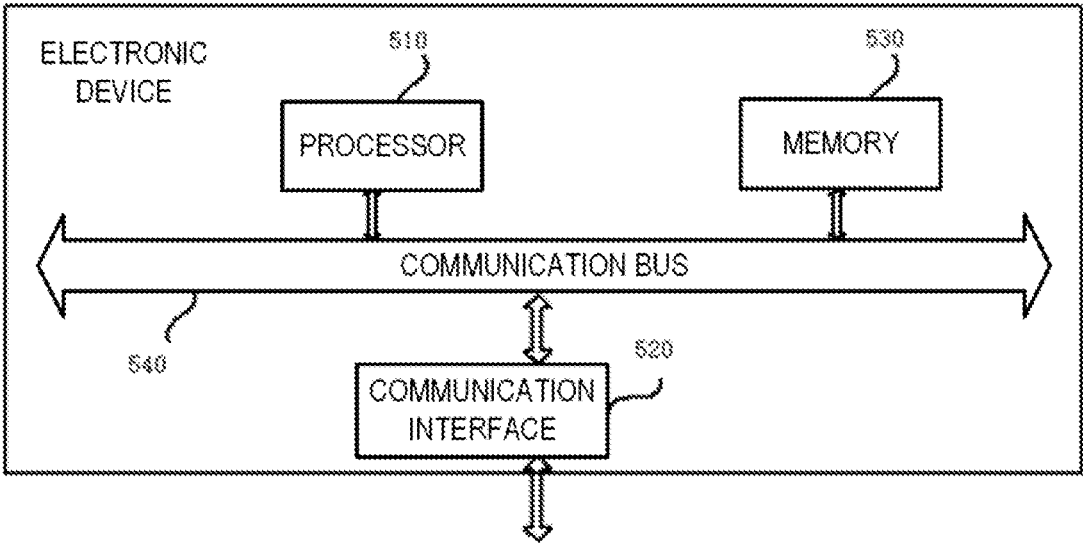
FIG. 5 is a schematic diagram of a structure of the electronic device provided in the present disclosure.

FIG. 5 illustrates a schematic diagram of an entity structure of an electronic device. As shown in FIG. 5, the electronic device may include: a processor 510, a communication interface 520, a memory 530, and a communication bus 540. The processor 510, the communication interface 520, and the memory 530 communicate with each other through the communication bus 540. The processor 510 may invoke a logical instruction in the memory 530 to perform a method for graphic rendering applied to the electronic device. The electronic device includes the first operating system and the second operating system. The second operating system shares a kernel with the first operating system and is deployed in the first operating system. The first operating system comprises the first thread, and the second operating system comprises the second thread. In the method, the first thread is created in a first namespace corresponding to a target rendering process based on a received graphic rendering task request. The target rendering process is a first operating system process. The first namespace is a namespace created in a process address space of the target rendering process and capable of running a thread of a second operating system graphic driver. In the first namespace, the second thread of a second operating system graphic driver is invoked by the first thread, to implement a graphic rendering task. In the first namespace, a first address of a first object in the first thread stored in a specified register is different from a second address of a second object in the second thread stored in the specified register.

In addition, the logical instructions in the aforementioned memory 530 may be implemented in a form of software functional units and may be stored in a computer-readable storage medium if sold or used as independent products. Based on such understanding, the technical solution of the present disclosure may be embodied in a form of a software product, which is stored in a storage medium and includes several instructions to make a computer device (which may be a personal computer, a server, or a network device, or the like) perform all or part of the steps of the methods described in respective embodiments of the present disclosure. The aforementioned storage medium includes a USB flash drive, a portable hard drive, a read-only memory (ROM), a random access memory (RAM), a magnetic disk or an optical disk, and other media that can store program code.

On the other hand, the present disclosure also provides a computer program product, and the computer program product comprises a computer program stored in a non-transient computer-readable storage medium. The computer program comprises a program instruction, and when the program instruction is executed by a computer, the computer may perform the method for graphic rendering provided in the respective methods mentioned above. The method is applied to an electronic device, and the electronic device comprises the first operating system and the second operating system. The second operating system shares a kernel with the first operating system and is deployed in the first operating system. The first operating system comprises a first thread, and the second operating system comprises a second thread. In the method, the first thread is created in a first namespace corresponding to a target rendering process based on a received graphic rendering task request. The target rendering process is a first operating system process. The first namespace is a namespace created in a process address space of the target rendering process and capable of running a thread of a second operating system graphic driver. In the first namespace, the second thread of a second operating system graphic driver is invoked by the first thread, to implement a graphic rendering task. In the first namespace, a first address of a first object in the first thread stored in a specified register is different from a second address of a second object in the second thread stored in the specified register.

On the other hand, the present disclosure also provides a non-transitory computer-readable storage medium, and the storage medium stores a computer program thereon that, when executed by a processor, implements the step of the respective methods for graphic rendering mentioned above. The method is applied to an electronic device, and the electronic device comprises the first operating system and the second operating system. The second operating system shares a kernel with the first operating system and is deployed in the first operating system. The first operating system comprises a first thread, and the second operating system comprises a second thread. In the method, the first thread is created in a first namespace corresponding to a target rendering process based on a received graphic rendering task request. The target rendering process is a first operating system process. The first namespace is a namespace created in a process address space of the target rendering process and capable of running a thread of a second operating system graphic driver. In the first namespace, the second thread of a second operating system graphic driver is invoked by the first thread, to implement a graphic rendering task. In the first namespace, a first address of a first object in the first thread stored in a specified register is different from a second address of a second object in the second thread stored in the specified register.

The apparatus embodiments described above are merely illustrative. The units described as separate components may or may not be physically separated, and the components displayed as units may or may not be physical units, i.e., may be located in one place or may be distributed to multiple network units. Some or all of the modules can be selected according to actual needs to achieve the purpose of the present embodiment. Those ordinary skilled in the art can understand and implement without creative effort.

Through the description of the above embodiments, those skilled in the art can clearly understand that each embodiment can be implemented by means of software plus a necessary universal hardware platform, or certainly by hardware. Based on such understanding, the above technical solution essentially or partly contributed to Prior Art can be embodied in the form of a software product. The software product can be stored in a computer-readable storage medium such as a ROM/RAM, a magnetic disk, an optical disk, or the like, including several instructions for causing a computer device (which can be a personal computer, a server, or a network device, or the like) to perform the method of respective embodiments or certain parts of the respective embodiments.

Finally, it should be noted that the above embodiments are only used to illustrate and not to limit the technical solutions of the present disclosure. Although the present disclosure has been described in detail with reference to the foregoing embodiments, those skilled in the art should understand that it is still possible to modify the technical solutions described in the foregoing embodiments or make an equivalent change to some of the technical features. These modifications or substitutions do not alter the essence of the corresponding technical solutions from the spirit and scope of the embodiments of the present disclosure.

What is claimed is:

1. A method for graphic rendering, comprising:

applying, at an electronic device, for a first namespace in a process address space of a target rendering process;

loading, in the first namespace, an executable and linkable format (ELF) file of a second operating system graphic driver;

constructing, in the first namespace, a dependency list of the second operating system graphic driver based on ELF header information in the ELF file of the second operating system graphic driver, wherein the dependency list of the second operating system graphic driver describes a dynamic library list on which the second operating system graphic driver depends in a second operating system;

initializing, in the first namespace, respective dynamic libraries on which the second operating system graphic driver depends in the second operating system;

creating a first thread in the first namespace corresponding to the target rendering process based on a received graphic rendering task request, wherein the target rendering process is a first operating system process, the first namespace being a namespace created in a process address space of the target rendering process and capable of running a second thread of the second operating system graphic driver; and invoking, in the first namespace, the second thread of the second operating system graphic driver by the first thread, to implement a graphic rendering task, wherein in the first namespace, a first address of a first object in the first thread stored in a specified register is different from a second address of a second object in the second thread stored in the specified register, wherein the electronic device comprises the first operating system and the second operating system, the second operating system shares a kernel with the first operating system and is deployed in the first operating system, and wherein the first operating system comprises the first thread, and the second operating system comprises the second thread.

2. The method of claim 1, wherein the constructing, in the first namespace, a dependency list of the second operating system graphic driver based on ELF header information in the ELF file of the second operating system graphic driver comprises:

loading a symbol table in the second operating system graphic driver into the first namespace based on the ELF header information of the second operating system graphic driver, and performing an address redirection on a symbol in the symbol table; and loading, based on the ELF header information of the second operating system graphic driver, the dynamic library list on which the second operating system graphic driver depends in the second operating system into the first namespace, to obtain the dependency list of the second operating system graphic driver.

3. The method of claim 2, wherein performing an address redirection on a symbol in the symbol table comprises:

for a plurality of reference symbols in the second operating system graphic driver, determining a symbol address by querying a procedure linkage table and a global offset table in the ELF file, and modifying a second operating system invocation symbol address to a first operating system invocation symbol address.

4. The method of claim 1, wherein the first object is a tcbhead_t structure, and the second object is a thread local storage TLS array, correspondingly, initializing, in the first namespace, respective dynamic libraries on which the second operating system graphic driver depends in the second operating system comprises:

intercepting, in the first namespace, a construction initialization of a system global variable associated with the second operating system graphic driver;

intercepting, in the first namespace, an initialization of a resource variable associated with the thread of the second operating system graphic driver;

initializing an attribute list of the second operating system graphic driver, and mapping the initialized attribute list to the first namespace; and setting, in the first namespace, the first address of the tcbhead_t structure in the first thread stored in the specified register or the second address of the TLS array in the second thread stored in the specified register, causing the first address to be different from the second address.

5. The method of claim 4, wherein setting the first address of the tcbhead_t structure in the first thread stored in the specified register or the second address of the TLS array in the second thread stored in the specified register comprises:

back-shifting an address of an index corresponding to the TLS array in the second thread in the specified register, to obtain the second address.

6. The method of claim 4, wherein setting the first address of the tcbhead_t structure in the first thread stored in the specified register or the second address of the TLS array in the second thread stored in the specified register comprises:

reserving an address of a portion before the tcbhead_t structure in the first thread in the specified register, to obtain the first address.

7. The method of claim 1, wherein the first operating system shares a Linux operating system kernel Linux Kernel with the second operating system, wherein the first thread is based on at least one C function library in libc, glibc, uclibc, klibc, eglibc, musl-libc, newlib, or dietlibc, and the second thread is based on at least one C function library in bionic, musl-libc, or libcrystax.

8. An electronic device, wherein the electronic device comprises a memory, a processor, and a computer program stored on the memory and executable on the processor, the processor, when executing the computer program, performs operations comprising:

applying for a first namespace in a process address space of a target rendering process;

loading, in the first namespace, an executable and linkable format (ELF) file of a second operating system graphic driver;

constructing, in the first namespace, a dependency list of the second operating system graphic driver based on ELF header information in the ELF file of the second operating system graphic driver, wherein the dependency list of the second operating system graphic driver describes a dynamic library list on which the second operating system graphic driver depends in a second operating system;

initializing, in the first namespace, respective dynamic libraries on which the second operating system graphic driver depends in the second operating system;

creating a first thread in the first namespace corresponding to the target rendering process based on a received graphic rendering task request, wherein the target rendering process is a first operating system process, the first namespace being a namespace created in a process address space of the target rendering process and capable of running a second thread of the second operating system graphic driver; and invoking, in the first namespace, the second thread of a second operating system graphic driver by the first thread, to implement a graphic rendering task, wherein in the first namespace, a first address of a first object in the first thread stored in a specified register is different from a second address of a second object in the second thread stored in the specified register, wherein the electronic device comprises the first operating system and the second operating system, the second operating system shares a kernel with the first operating system and is deployed in the first operating system, and wherein the first operating system comprises the first thread, and the second operating system comprises the second thread.

9. The electronic device of claim 8, wherein the constructing, in the first namespace, a dependency list of the second operating system graphic driver based on ELF header information in the ELF file of the second operating system graphic driver comprises:

loading a symbol table in the second operating system graphic driver into the first namespace based on the ELF header information of the second operating system graphic driver, and performing an address redirection on a symbol in the symbol table; and loading, based on the ELF header information of the second operating system graphic driver, the dynamic library list on which the second operating system graphic driver depends in the second operating system into the first namespace, to obtain the dependency list of the second operating system graphic driver.

10. The electronic device of claim 9, wherein performing an address redirection on a symbol in the symbol table comprises:

for a plurality of reference symbols in the second operating system graphic driver, determining a symbol address by querying a procedure linkage table and a global offset table in the ELF file, and modifying a second operating system invocation symbol address to a first operating system invocation symbol address.

11. The electronic device of claim 8, wherein the first object is a tcbhead_t structure, and the second object is a thread local storage TLS array, correspondingly, initializing, in the first namespace, respective dynamic libraries on which the second operating system graphic driver depends in the second operating system comprises:

intercepting, in the first namespace, a construction initialization of a system global variable associated with the second operating system graphic driver;

intercepting, in the first namespace, an initialization of a resource variable associated with the thread of the second operating system graphic driver;

initializing an attribute list of the second operating system graphic driver, and mapping the initialized attribute list to the first namespace; and setting, in the first namespace, the first address of the tcbhead_t structure in the first thread stored in the specified register or the second address of the TLS array in the second thread stored in the specified register, causing the first address to be different from the second address.

12. The electronic device of claim 11, wherein setting the first address of the tcbhead_t structure in the first thread stored in the specified register or the second address of the TLS array in the second thread stored in the specified register comprises:

back-shifting an address of an index corresponding to the TLS array in the second thread in the specified register, to obtain the second address.

13. The electronic device of claim 11, wherein setting the first address of the tcbhead_t structure in the first thread stored in the specified register or the second address of the TLS array in the second thread stored in the specified register comprises:

reserving an address of a portion before the tcbhead_t structure in the first thread in the specified register, to obtain the first address.

14. The electronic device of claim 8, wherein the first operating system shares a Linux operating system kernel Linux Kernel with the second operating system, wherein the first thread is based on at least one C function library in libc, glibc, uclibc, klibc, eglibc, musl-libc, newlib, or dietlibc, and the second thread is based on at least one C function library in bionic, musl-libc, or libcrystax.

15. A non-transitory computer-readable storage medium, wherein the storage medium stores a computer program thereon that, when executed by an electronic device, performs operations comprising:

applying for a first namespace in a process address space of a target rendering process;

loading, in the first namespace, an executable and linkable format (ELF) file of a second operating system graphic driver;

constructing, in the first namespace, a dependency list of the second operating system graphic driver based on ELF header information in the ELF file of the second operating system graphic driver, wherein the dependency list of the second operating system graphic driver describes a dynamic library list on which the second operating system graphic driver depends in a second operating system;

initializing, in the first namespace, respective dynamic libraries on which the second operating system graphic driver depends in the second operating system;

creating a first thread in the first namespace corresponding to the target rendering process based on a received graphic rendering task request, wherein the target rendering process is a first operating system process, the first namespace being a namespace created in a process address space of the target rendering process and capable of running a second thread of the second operating system graphic driver; and invoking, in the first namespace, the second thread of a second operating system graphic driver by the first thread, to implement a graphic rendering task, wherein in the first namespace, a first address of a first object in the first thread stored in a specified register is different from a second address of a second object in the second thread stored in the specified register, wherein the electronic device comprises the first operating system and the second operating system, the second operating system shares a kernel with the first operating system and is deployed in the first operating system, and wherein the first operating system comprises the first thread, and the second operating system comprises the second thread.

16. The non-transitory computer-readable storage medium of claim 15, wherein the constructing, in the first namespace, a dependency list of the second operating system graphic driver based on ELF header information in the ELF file of the second operating system graphic driver comprises:

loading a symbol table in the second operating system graphic driver into the first namespace based on the ELF header information of the second operating system graphic driver, and performing an address redirection on a symbol in the symbol table; and loading, based on the ELF header information of the second operating system graphic driver, the dynamic library list on which the second operating system graphic driver depends in the second operating system into the first namespace, to obtain the dependency list of the second operating system graphic driver.

17. The non-transitory computer-readable storage medium of claim 15, wherein the first object is a tcbhead_t structure, and the second object is a thread local storage TLS array, correspondingly, initializing, in the first namespace, respective dynamic libraries on which the second operating system graphic driver depends in the second operating system comprises:

intercepting, in the first namespace, a construction initialization of a system global variable associated with the second operating system graphic driver;

intercepting, in the first namespace, an initialization of a resource variable associated with the thread of the second operating system graphic driver;

initializing an attribute list of the second operating system graphic driver, and mapping the initialized attribute list to the first namespace; and setting, in the first namespace, the first address of the tcbhead_t structure in the first thread stored in the specified register or the second address of the TLS array in the second thread stored in the specified register, causing the first address to be different from the second address.

* * * * *